United States Patent

Nagai et al.

[11] Patent Number: 4,594,292
[45] Date of Patent: Jun. 10, 1986

[54] METAL-RESIN-METAL SANDWICH LAMINATES SUITABLE FOR USE IN PRESS FORMING

[75] Inventors: Hiroyuki Nagai, Nishinomiya; Minoru Nishihara, Kyoto; Toshiaki Shiota, Takatsuki, all of Japan

[73] Assignees: Sumitomo Metal Industries, Ltd.; Sumitomo Chemical Co., Ltd., both of Osaka, Japan

[21] Appl. No.: 658,917

[22] Filed: Oct. 9, 1984

Related U.S. Application Data

[63] Continuation-in-part of Ser. No. 458,944, Jan. 18, 1983, abandoned.

[51] Int. Cl.⁴ ............................................. B32B 15/08
[52] U.S. Cl. .................................... 428/458; 428/412; 428/421; 428/425.8; 428/461; 428/462; 428/463; 428/465; 428/522
[58] Field of Search ........ 428/461, 458, 463, 516–522, 428/465, 421, 425.8, 412, 462

[56] References Cited

U.S. PATENT DOCUMENTS 4,313,996  2/1982  Newman et al. .................... 428/215

Primary Examiner—Edith Buffalow
Attorney, Agent, or Firm—Burns, Doane, Swecker and Mathis

[57] ABSTRACT

A rigid metal-resin-metal sandwich laminate capable of withstanding 180° bending with a threshold bending inner diameter of less than or equal to twice the total laminate thickness and suitable for use in the manufacture of building materials, containers, and particularly automotive parts including automotive outer panels is disclosed. The laminate comprises a resin layer sandwiched between and bonded to outer metal layers wherein the resin layer is comprised of a core sheet sandwiched between outer resin sheets, said core sheet being made of a resin which exhibits plastic behavior and which is bonded to said outer resin sheets with or without an adhesive layer, and said outer resin sheets being made of a ductile resin which does not exhibit yielding behavior or necking when stretched.

16 Claims, 3 Drawing Figures

METAL-RESIN-METAL SANDWICH LAMINATES SUITABLE FOR USE IN PRESS FORMING

CROSS-REFERENCES TO RELATED APPLICATIONS

This is a continuation-in-part application of U.S. Ser. No. 458,944 filed Jan. 18, 1983 now abandoned.

BACKGROUND OF THE INVENTION

This invention relates to metal-resin-metal sandwich laminates suitable for use in working, e.g. press forming with 180° bending. More particularly, it relates to metal-resin-metal sandwich laminates which can be subjected to severe bending and drawing with no cracks in the outer metal layers and with minimized springback of the worked laminates.

Metal-resin-metal sandwich construction panels or sandwich laminates which comprise a resin core layer sandwiched between and bonded to outer metal layers are characterized by their excellent heat insulating and vibration damping properties as well as their light weight. In view of these characteristics, they were developed initially for use as building materials and, in fact, they have heretofore been employed mainly in such applications. Recently, however, the use of these sandwich laminates in the fabrication of various parts of automobiles and other vehicles has been studied with particular attention to their light weight. In such applications, the laminates are required to have good workability because they undergo relatively severe working such as bending and drawing during fabrication into the desired articles. Specifically, in these applications, the edge of a laminate is often bent to 180° with a very small diameter nearly equal to its thickness in order to secure it to another sheet or laminate by lock seaming as shown in FIG. 2. Therefore, it is important for laminates for use in the fabrication of automobile parts such as automobile bodies to be capable of withstanding severe 180° bending. Unfortunately the construction of the prior art metal-resin-metal sandwich laminates which have generally been employed as building materials or the like is not suited at all to undergo severe working since the outer metal layers bonded to the resin core layer tend to come away from the resin layer by the force applied thereon during bending, resulting in partial or complete delamination. In order to overcome this problem, it is known that the bond strength between a resin and a metal layer in a laminate can be retained even after bending when the resin is modified so as to have good adhesion to the metal. However, when certain modified resins such as modified polypropylene are employed as the resin core layer, they offer another problem in that cracking of the outer metal layers tends to occur during bending. Therefore, such laminates also cannot withstand severe working.

Many techniques have been proposed in the prior art to avoid deterioration in workability of metal-resin-metal sandwich laminates or to improve workability thereof. For example, Japanese Patent Publication No. 4739/1964 discloses specific requirements which ensure that a laminate will not spring back after bending and that delamination and breaking of the resin sheet will not occur during bending. It is proposed in Japanese Patent Publication No. 30111/1972 that powdered inorganic material be incorporated in the resin layer to improve cold workability of the laminate. However, neither of these prior art techniques gives special consideration to cracking of the outer metal layers during bending and therefore it cannot be expected that they are effective to avoid such cracking.

U.S. Pat. No. 4,313,996 to Newman et al., the Japanese counterpart of which is Japanese Patent Laid-Open Specification No. 156052/1980, discloses metal-plastic-metal laminates capable of withstanding bending up to an angle of 90°. However, in view of the severe working actually encountered in the manufacture of automobile parts, it cannot be said that these laminates are satisfactory for automobile applications.

We have made various experiments to study the reason why cracking of the outer metal layers occurs during working and found that this type of cracking is caused by necking of the resin layer at or adjacent to the interfaces (i.e., bonded surfaces) between the resin and metal layers during working. The necking phenomenon means that the resin has yielded under the stress applied thereto during working. It is expected, therefore, that the use of a resin material which does not exhibit any yielding behavior (i.e., which does not have an yielding point) as the resin layer is effective to prevent cracking of the metal layers during working. It was, in fact, found that if the resin used as the core layer had enough ductility to enable it to follow severe working but had no yielding point, cracking of the outer metal layers could be avoided during working.

However, these ductile resins which do not exhibit any yielding behavior, in general, have elastomeric properties and their elastic limits are usually high. Therefore, sandwich laminates comprising such resin as a resin core layer may tend to spring back to a relatively greater extent upon working and hence are not suitable for use in working in some applications. In addition, this type of resins often has low softening temperatures so that the laminates may no longer retain their good heat resisting properties characteristic of sandwich laminates.

SUMMARY OF THE INVENTION

Thus, it is an object of the present invention to provide metal-resin-metal sandwich laminates suitable for use in press forming.

Another object of the invention is to provide sandwich laminates capable of undergoing severe working such as bending and drawing without the outer metal layers cracking during working.

Still another object is to provide metal-resin-metal sandwich laminates which possess the properties required for working purposes such as minimized springback of the worked laminates without loss of desirable properties inherent in this type of laminates such as good heat resistance.

A further object of the invention is to provide steel-resin-steel sandwich laminates having improved resistance to corrosion, particularly to corrosion beginning at their edge faces.

A still further object is to provide automobile bodies which can be worked without cracking.

The present invention resides in a rigid metal-resin-metal sandwich laminate capable of withstanding 180° bending with a threshold bending inner diameter of less than or equal to twice the total laminate thickness, said laminate comprising a resin layer sandwiched between and bonded to outer metal layers, characterized in that the resin layer is comprised of a core sheet sandwiched between outer resin sheets, said core sheet being made of a resin which exhibits plastic behavior and which is bonded to said outer resin sheets with or without an adhesive layer, and said outer resin sheets being made of a ductile resin which does not exhibit any yielding behavior or necking upon being stretched.

DETAILED DESCRIPTION OF THE PREFERRED EMBODIMENTS

The sandwich laminates of the present invention are now described in detail below with reference to the accompanying drawings.

Figure 1:
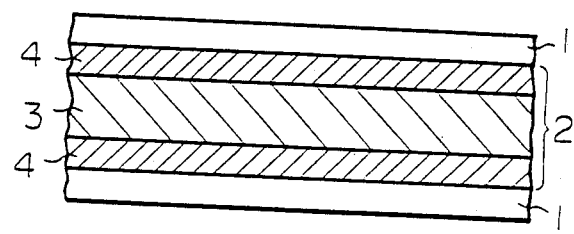
FIG. 1 is a schematic cross-sectional view of a sandwich laminate of the present invention.
Figure 2:
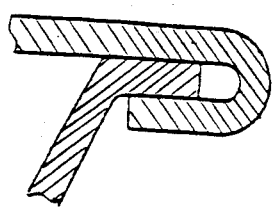
FIG. 2 is an illustration of lock seaming to secure two panels by bending and pressing.

The laminate shown in FIG. 1 is comprised of two outer metal layers 1,1 and a resin layer 2 sandwiched between the metal layers. According to the present invention, resin layer 2 itself is also comprised of three layers, i.e., core sheet 3 and two outer sheets 4,4. Core sheet 3 is made of a resin which exhibits plastic behavior and is sandwiched between the outer sheets. Each of outer sheets 4,4 is made of a ductile resin which does not exhibit yielding behavior. By virtue of such three layered strcture of the resin layer, the respective inferior properties of these different two resins can offset each other and it is possible to effectively utilize their respective advantageous properties. As a result, the sandwich laminate can be subjected to severe working such as bending at 180° with no cracking in the outer metal layer during working and with minimized level of springback of the worked laminate. Other desirable properties characteristic of sandwich laminates including heat resistance are not deteriorated appreciably in the laminate of the invention.

The outer metal layers 1,1 may be comprised of any metallic materials including iron, aluminum, copper, tin, nickel, titanium and alloys thereof. The metal sheets used as the outer metal layers may be coated with a corrosion resistant metal such as zinc, tin, chromium or the like on one or both surfaces thereof. Similarly, the surface of each metal sheet not facing the resin layer may be coated with such resin as epoxy or melamine resin.

When steel sheets are used as the outer metal layers, at least one surface of each metal sheet facing the resin layer is usually subjected to surface treatment for corrosion protection prior to laminating in order to provide the laminate with satisfactory corrosion resistance. The surface treatment techniques useful for this purpose include chemical treatment, plating and vacuum deposition. Preferably the surface treatment of steel sheets is conducted by electrolytic chromate treatment, Ni—Zn alloy plating or Fe—Zn alloy plating. Such surface treatment is particularly effective to prevent corrosion beginning at the edge faces of the laminate, which is often encountered when the laminate is exposed to relatively corrosive environment and which results in a significant decrease in bond strength between the resin and metal layers thereby ultimately causing delamination. It is preferred that the plated coating of Ni—Zn alloy contain 1-20% by weight of Ni and that of Fe—Zn alloy contain 5-60% by weight of Fe.

The resins exhibiting plastic behavior which are suitable for use as the above-mentioned core sheet 3 include polyethylene, polypropylene, poly(4-methylpentene-1), poly(vinyl chloride), ABS resin (acrylonitrile-butadiene-styrene copolymer), fluorocarbon resins, polyamides, polyesters, polycarbonates, polyacetals, acrylic resins and copolymers of these. The term "plastic behavior" used herein means that the resin does not exhibit rubber elasticity ("rubber elasticity" means that when it is stretched by several ten percents and the load is then removed it can recover its original length) and has an elongation of at least 100%. Preferably core sheet 3 is made of a ductile resin which exhibits both plastic and yielding behavior. Examples of such resins are polyethylene, polypropylene, poly(4-methyl-pentene-1), polyamides, and polyesters. Other resins and additives such as plasticizers and inorganic fillers may be incorporated in the resins in minor amounts.

Figure 3:
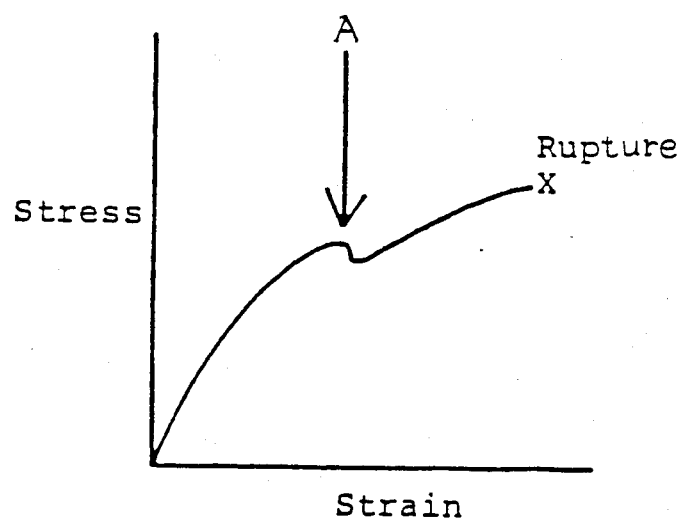
FIG. 3 is a graph showing a typical stress-strain curve of a resin which exhibits yielding behavior.

As discussed above, outer resin sheets 4,4 are made of a ductile resin which does not exhibit yielding behavior. The non-yielding properties of a resin can be determined by preparing a strain-stress curve of the resin according to ASTM D638. A typical stress-strain curve of a resin which exhibits yielding behavior is shown in FIG. 3. The inflection point shown by arrow A indicates that the resin has yielded under stress at that point. On the other hand, a non-yielding resin does not give such an inflection point on a stress-strain curve. For the purpose of the present invention, the term "ductile" means that the resin has an elongation of not less than 20% as determined according to ASTM D638.

One class of ductile and non-yielding resin useful in the present invention as outer resin sheets is copolymers of a lower α-olefin such as ethylene or propylene with one or more α,β-ethylenically unsaturated compounds such as α-olefins, acids or esters as well as blends of a polymer (i.e., polymeric blend) of such a lower α-olefin with one or more polymers of α,β-ethylenically unsaturated compound or compounds. Examples of the α,β-ethylenically unsaturated compound are ethylene, propylene, butadiene, butene-1, 4-methylpentene-1, acrylic acid, methacrylic acid, vinyl acetate, glycidyl methacrylate, maleic anhydride, and the like. In order to render a polymer of a lower α-olefin ductile and non-yielding, it has been found that the amount of the α,β-ethylenically unsaturated monomer or monomers copolymerized or blended is critical. In the case of ethylene copolymers and polyethylene blends, for example, from about 15% to about 50% by weight based on the weight of the copolymer or blend of α,β-ethylenically unsaturated monomer(s) should be present in the polyethylene copolymer or blend to impart non-yielding property thereto, while in the case of propylene copolymers or polypropylene blends a larger amount of from about 20% to about 85%, preferably at least about 40% by weight of α,β-ethylenically unsaturated monomers should be present because of more rigid properties of polypropylene as compared with polyethylene.

The aforementioned Newman et al., U.S. Pat. No. 4,313,996 discloses a metal-resin-metal laminate in which an adhesive layer which is preferably made of a copolymer of ethylene and a minor proportion, typically 1-30%, more preferably 2-20% by weight, of an ethylenically unsaturated carboxylic acid such as acrylic acid or methacrylic acid is interposed between the resin core layer and each metal sheet. However, Newman et al do not disclose the use of a layer made of a ductile and non-yielding resin between the resin core and each metal layer so that they do not teach nor suggest about the criticality of the amount of the ethylenically unsaturated monomer copolymerized with ethylene in order to render it ductile and non-yielding as discussed above. In fact, all the adhesive layers employed in the examples of Newman et al are coatings or films of ethylene-acrylic acid copolymer containing 8% acrylic acid, which will exhibit yielding behavior because the amount of acrylic acid is much lower than 15% which is the minimum amount required to render a polyethylene non-yielding. In addition, Newman et al. do not disclose the 180° bending properties of the laminates, although they describe that the laiminate disclosed therein can be bent to 90°.

Another class of the ductile and non-yielding resin useful in the present invention as the material for the outer resin sheets is a copolymer or blend of poly(vinyl chloride) with one or more $\alpha,\beta$-ethylenically unsaturated monomers or a blend of poly(vinyl chloride) with one or more plasticizers. For the purpose of this invention, vinyl chloride polymer or blend may preferably up to about 70% by weight of the unsaturated monomer component or up to about 50% by weight of the plasticizer component.

A third class of the ductile and non-yielding resin useful in the present invention is an elastomer which includes polyurethane, chlorosulfonated polyethylene and various rubbers.

A fourth class is polyesters or polyamides which are modified so as to render them non-yielding. Examples of modified polyamides useful in the invention as materials for outer resin sheets are nylon-6 copolymerized with an alkylene diamine or dicarboxylic acid (e.g., hexamethylene diamine or adipic acid) or a cyclic amino acid (e.g., $\epsilon$-caprolactam) or its ring opened amino acid. Examples of modified polyesters which can be used to form the outer resin sheets are poly(ethylene terephthalate) modified or copolymerized with one or more other acid or alcohol components selected from aliphatic dicarboxylic acids of 2 to 20 carbon atoms (e.g., azelaic acid, sebacic acid, adipic acid, dodecanedicarboxylic acid), aromatic dicarboxylic acids (e.g., isophthalic acid), cycloaliphatic dicarboxylic acids (e.g., cyclohexane dicarboxylic acid) and aliphatic or cycloaliphatic glycols or polyols (e.g., 1,3-propanediol, 1,4-butanediol, 1,6-hexanediol, 1,10-decanediol, neopentyl glycol, 1,4-cyclohexanediol, 2-ethyl-2-butyl-1,3-propanediol, glycerol, pentaerythritol).

In the cases where adhesion between core sheet 3 and each outer sheet 4 of the resin layer 2 is not enough to ensure bonding, it is necessary to interpose an adhesive layer between these sheets. The adhesive layer useful for this purpose may be formed of such adhesive resins as adhesive polyethylene and adhesive polypropylene.

Each outer resin sheet 4 should have enough adhesion to be bonded to outer metal layer 1. If the resin used as outer resin sheet 4 has poor adhesion to the metal in itself, the bonding strength between outer resin sheet 4 and metal layer 1 can be increased to a desired level either by incorporating an adhesive resin in the resin to be used as outer sheet 4, by modifying the resin with an unsaturated carboxylic acid or its ester or anhydride (e.g., acrylic acid, an acrylate or methacrylate, or maleic anhydride), or by modifying the resin through an appropriate reaction such as chlorination or chlorosulfonation.

The thickness of each layer or sheet is not critical in the sandwich laminates of the present invention, and may be selected depending on the purpose of use thereof. However, it is preferred that the thickness of each outer resin sheet 4 be at least 1 $\mu$m so as to ensure that the outer metal layers have good resistance to cracking during working such as bending. Usually each outer metal layer 1 has a thickness in the range of from 0.05 to 2.0 mm, preferably from 0.1 to 1.0 mm. The thickness of resin layer 2 is usually in the range of from 0.1 to 10 mm, preferably from 0.2-2.0 mm. As mentioned above, the thickness of each outer resin sheet 4 is preferably at least 1 $\mu$m and more preferably it is at least 5 $\mu$m.

The sandwich laminates of the present invention may be prepared by a conventional laminating technique wherein two or more layers are heated and bonded together under pressure, for example, through a hot press or pressure rolls and then cooled. The laminating may be carried out in one step, that is, all the sheets constituting the sandwich laminate may be laminated at the same time. Alternatively, the laminating of the sheets may be carried out stepwise.

The following examples are given to illustrate the claimed invention. It should be understood, however, that the invention is not limited to the specific details set forth in the example.

EXAMPLE 1

Various metal-resin-metal sandwich laminates having the construction shown in FIG. 1 were prepared by hot pressing at a pressure of 20 kg/cm$^2$. In each sandwich laminate, resin layer 2 was comprised of core sheet 3 sandwiched between outer resin sheets 4,4 and resin layer 2 itself was sandwiched between outer metal layers 1,1. If necessary, an adhesive layer is placed between core sheet 3 and each outer resin 4. The materials for these laminations (i.e., sheets or layers constituting the laminates) are indicated in Table 1 below together with the laminating temperatures (i.e., hot pressing temperatures). Each of the sandwich laminates thus obtained was subjected to 180° bending test at room temperature to determine the threshold bending inner diameter, that is, the minimum inner diameter of the 180° bend of the laminate in which no cracks were observed in the outer metal layers after bending and to determine the extent of springback of the laminate after bending. The heat resistance of each sandwich laminate was also evaluated by determining the maximum heat resisting temperature at which the sandwich laminate could be kept with no deformation. The test results are also summarized in Table 1, in which the ratings of heat resistance indicate the following maximum heat resisting temperatures:

| Rating | Maximum Heat Resisting Temperature |
|---|---|
| I | 200° C. (very good) |
| II | 150° C. (good) |
| III | 120° C. (fair) |
| IV | 100° C. (poor) |

TABLE 1

| | No. | Outer metal layer (1) | Resin core sheet (3) | Resin outer sheet (4) | Adhesive layer | Yielding behavior and necking of outer resin sheet | Laminating temp. (°C.) | Threshold bending inner diameter | Extent of spring-back | Heat resistance |
|---|---|---|---|---|---|---|---|---|---|---|
| This invention | 1 | Steel* (0.2 mm) | Nylon 6 (0.4 mm) | Resin A (50μ) | — | None | 230 | 0 mm | Small | I |
| | 2 | Stainless steel (0.3 mm) | Polypropylene (0.6 mm) | Resin B (30μ) | Resin C (5 μ) | None | 200 | 1 mm | Small | II |
| | 3 | Steel* (0.2 mm) | ABS resin (0.8 mm) | Polyurethane (10μ) | — | None | 200 | 0 mm | Small | II |
| | 4 | " | Polyethylene (0.6 mm) | Resin D (20μ) | — | None | 180 | 0 mm | Small | II-III |
| Comparative | 5 | " | Resin C (0.4 mm) | — | — | Yes | 200 | 4 mm | Small | II |
| | 6 | " | Resin C (0.6 mm) | — | — | Yes | 200 | 5 mm | Small | II |
| | 7 | " | Resin C (0.8 mm) | — | — | Yes | 200 | 7 mm | Small | II |
| | 8 | " | Resin A (0.4 mm) | — | — | Yes | 150 | 0 mm | Large | IV |

(NOTE)
Resin A: Vinyl acetate-acrylic acid-ethylene copolymer (3%-15%-82%).
Resin B: Nitrile rubber modified with 30% phenol.
Resin C: Polypropylene modified with 3% maleic anhydride.
Resin D: Chlorosulfonated polyethylene.
*Cold rolled steel sheet.

As can be seen from Table 1, sandwich laminate Nos. 1-4 in which the resin layer was comprised of a core sheet made of a resin exhibiting both plastic and yielding behavior and outer sheets made of a resin not exhibiting yielding behavior according to the present invention showed very good workability. That is, in all the laminate Nos. 1-4 the threshold bending inner diameter was 1 mm or less and in most of these laminates it was 0 mm. In addition, these sandwich laminates showed springback only to a small extent and their heat resistance remained at a satisfactory level required for sandwich laminates.

In contrast, laminate Nos. 5-7 which are comparative examples showed poor workability in that the threshold bending inner diameter was larger than 4 mm in all these examples. These sandwich laminates was comprised of a resin layer formed of a single layer of modified polypropylene which exhibited yielding behavior. Laminate No. 8 which is also a comparative example because the resin layer was formed of a single layer of a resin which exhibited no yielding behavior showed springback to a large extent and it might hence not be suitable for use in working, although it had a satisfactory result on the threshold bending inner diameter. In addition, laminate No. 8 involved another problem with respect to heat resistance.

EXAMPLE 2

Cold rolled 0.2 mm thick steel sheets with or without various surface coatings formed by zinc plating, electrolytic chromate treatment, Ni—Zn alloy plating or Fe—Zn alloy plating were degreased, rinsed with water and then subjected to chromate treatment. The Ni—Zn and Fe—Zn alloy plating was conducted so as to provide coatings of different Ni and Fe contents, respectively, as indicated in Tables 3 and 4 below. The chromate treatment was carried out by dipping the sheets in an aqueous solution of Parcolene 62 (manufactured by Nihon Parkerizing K.K.) having a concentration of 20 g/l at 50° C., then wiping through rollers and drying by hot air. After the chromate treatment, two pieces of each steel sheet were used to prepare a metal-resin-metal sandwich laminate. The resin sandwiched between the steel sheets was a resin laminate comprised of a 0.5 mm thick polyethylene sheet sandwiched between outer resin sheets of vinyl acetate-acrylic acid-ethylene copolymer (3%-15%-82% by weight) each having a thickness of 50 μm, and the laminating was carried out by hot pressing at 150° C. and at 20 kg/cm². The outer resin sheets do not exhibit yielding behavior or necking upon being stretched.

A test piece 10 mm wide×200 mm long was cut out of each resulting metal-resin-metal sandwich laminate and subjected to a salt spray test (SST) at 35° C. for 20 days using a 5% NaCl solution. Before and after this test, the bond strength of the test piece was determined by a peel test at a rate of pulling of 50 mm/min. Another test piece of the same size was bent with a bending inner diameter of 5 mm and subjected to the salt spray test. After the salt spray test, the degree of corrosion at the edge faces of the laminate was evaluated on each of the flat and bent test pieces. The results are summarized in Tables 2, 3 and 4 below.

EXAMPLE 3

Following the procedure of Example 1, various laminates were prepared and tested. The materials and the test results are summarized in Table 5 below.

TABLE 2

| | | Electrolytic Chromate Treatment | |
|---|---|---|---|
| | | Bond strength (kg/cm) | |
| No. | Steel sheet | Initial | After SST* |
| 1 | Cold rolled steel sheet subjected to electrolytic chromate treatment** | 4.7 | 4.0 |
| 2 | Zinc plated steel sheet subjected to electrolytic chromate treatment** | 5.0 | 4.3 |
| 3 | Cold rolled steel sheet | 4.0 | 1.0 |
| 4 | Zinc plated steel sheet | 4.7 | 0 |

*Salt spray test
**Cr weight in the coating: 210 mg/m².

TABLE 3

Ni—Zn Alloy Plating

| No. | Steel sheet Type | % Ni in coating | Coating weight (g/m², each side) | Bond strength (kg/cm) Initial | Bond strength (kg/cm) After SST | Corrosion resistance at edge face after SST Flat | Corrosion resistance at edge face after SST Bent |
|---|---|---|---|---|---|---|---|
| 1 | Ni—Zn plated | 13 | 20 | 4.8 | 4.1 | Good | Good |
| 2 | " | 13 | 45 | 4.5 | 4.0 | " | " |
| 3 | " | 13 | 90 | 4.6 | 4.0 | " | " |
| 4 | " | 13 | 150 | 5.0 | 3.9 | " | Poor |
| 5 | " | 6 | 20 | 4.8 | <0.5 | Poor | Poor |
| 6 | " | 25 | 20 | 4.4 | 1.3 | Slight poor | Slight poor |
| 7 | Cold rolled sheet | — | — | 4.0 | 1.0 | Poor | Poor |
| 8 | Zn plated | 0 | 20 | 4.7 | 0 | " | " |

TABLE 4

Fe—Zn Alloy Plating

| No. | Steel Sheet Type | % Fe in coating | Coating weight (g/m², each side) | Bond strength (kg/cm) Initial | Bond strength (kg/cm) After SST | Corrosion resistance at edge face after SST Flat | Corrosion resistance at edge face after SST Bent |
|---|---|---|---|---|---|---|---|
| 1 | Fe—Zn plated | 10 | 20 | 4.4 | 3.5 | Good | Good |
| 2 | " | 40 | 20 | 4.6 | 3.7 | " | " |
| 3 | " | 40 | 60 | 4.5 | 3.6 | " | " |
| 4 | " | 40 | 100 | 4.5 | 3.7 | " | " |
| 5 | " | 40 | 150 | 4.3 | 3.6 | " | Poor |
| 6 | " | 2 | 20 | 4.5 | <0.5 | Poor | " |
| 7 | " | 70 | 20 | 4.7 | 1.6 | Slight poor | Slight poor |
| 8 | Cold rolled sheet | — | — | 4.0 | <0.5 | Poor | Poor |
| 9 | Zn plated | 0 | 20 | 4.8 | 0 | " | " |

TABLE 5

| Run No. | Resin Core Sheet Resin (wt %) | Resin Core Sheet Plastic Behavior | Resin Outer Sheet Resin (wt %) | Resin Outer Sheet Yielding Behavior | Resin Outer Sheet Spring-back | Threshold Bending Inner Diameter (mm) | 180° Bending | Remarks |
|---|---|---|---|---|---|---|---|---|
| 1 | Polyethylene | Yes | Ethylene/acrylic acid copolymer (70/30) | None | Small | 0 | No cracking | This invention |
| 2 | Polypropylene | Yes | Propylene/ethylene maleic anhydride copolymer (78/19/3) | None | Small | 0 | No cracking | This invention |
| 3 | Polyethylene | Yes | Ethylene/acrylic acid copolymer (90/10) | Yes | Small | 3 | Cracking | Comparative |
| 4 | Polystyrene | None | Ethylene/acrylic acid copolymer (70/30) | None | Small | 3 | Cracking | Comparative |
| 5 | Polyethylene | Yes | Polyvinyl chloride | Yes | Small | 4 | Cracking | Comparative |

As discussed above, the laminates according to the present invention can satisfactorily withstand severe bending and drawing and do not spring back to a large extent after working. Furthermore, they still retain the favorable properties charactristic of metal-resin-metal sandwich laminates such as good heat resistance. Accordingly they greatly contribute to expansion of the field of application of metal-resin-metal sandwich laminates.

The sandwich laminates of the present invention are particularly suitable for use in the manufacture of automobile bodies including doors, fenders, hoods, trunk lids, etc. They are also applicable to the manufacture of other articles such as interior panels of vehicles and buildings, containers, snowmobiles, and housings of various devices including computers.

Although the invention has been described with its preferred embodiments, it is to be understood that variations and modifications may be employed without departing from the concept of the invention as defined in the claims.

What is claimed is:

1. A rigid metal-resin-metal sandwich laminate capable of withstanding 180° bending with a threshold bending inner diameter of zero, said laminate comprising a resin layer sandwiched between and bonded to outer metal layers, characterized in that the resin layer is comprised of a core sheet sandwich between outer resin sheets, said core sheet being made of a resin which exhibits plastic behavior and which is bonded to said outer resin sheets with or without an adhesive layer and said outer resin sheets being made of a ductile resin which does not exhibit yielding behavior or necking when stretched, and said outer resin sheet being made of a copolymer or polymeric blend of a lower α-olefin selected from ethylene and propylene with from about 15% to about 50% by weight for ethylene or from about 20% to about 85% by weight for propylene based on the copolymer or blend of one or more α,β-ethylenically unsaturated monomers.

2. The rigid metal-resin-metal sandwich laminate according to claim 1 wherein said monomer is present in an amount of at least 40 wt % for propylene.

3. The rigid metal-resin-metal sandwich laminate according to claim 2 wherein said outer layer is made of a copolymer of ethylene with from about 15% to about 30% by weight of acrylic acid or methacrylic acid.

4. A rigid metal-resin-metal sandwich laminate capable of withstanding 180° bending with a threshold bending inner diameter of zero, said laminate comprising a resin layer sandwiched between and bonded to outer metal layers, characterized in that the resin layer is comprised of a core sheet sandwiched between outer resin sheets, said core sheet being made of a resin which exhibits plastic behavior and which is bonded to said outer resin sheets with or without an adhesive layer and said outer resin sheets being made of a ductile resin which does not exhibit yielding behavior or necking when stretched, and said outer resin sheet being made of a copolymer or polymeric blend of vinyl chloride with up to about 70% by weight based on the copolymer or blend of one or more α,β-ethylenically unsaturated monomers, or a blend of poly(vinyl chloride) with up to about 50% by weight based on the blend of one or more plasticizers.

5. A rigid metal-resin-metal sandwich laminate capable of withstanding 180° bending with a threshold bending inner diameter of zero, said laminate comprising a resin layer sandwiched between and bonded to outer metal layers, characterized in that the resin layer is comprised of a core sheet sandwiched between outer resin sheets, said core sheet being made of a resin which exhibits plastic behavior and which is bonded to said outer resin sheets with or without an adhesive layer and said outer resin sheets being made of a ductile resin which does not exhibit yielding behavior or necking when stretched, and said outer resin sheet being made of elastomeric resins selected from polyurethanes, chlorosulfonated polyethylene and rubbers.

6. The rigid metal-resin-metal sandwich laminate according to claim 1 wherein the outer metal layers are steel sheets each having a corrosion-resistant coating on at least the surface facing the resin core layer.

7. The rigid metal-resin-metal sandwich laminate according to claim 6 wherein the steel sheets are cold rolled steel sheets.

8. The rigid metal-resin-metal sandwich laminate according to claim 6 wherein the corrosion-resistant coating on each steel sheet is formed by electrolytic chromate treatment, Ni—Zn alloy plating or Fe—Zn alloy plating.

9. The rigid metal-resin-metal sandwich laminate according to claim 1 wherein the core sheet of the resin layer is made of a resin which exhibits both plastic and yielding behavior.

10. An article made of the sandwich laminate defined in claim 1.

11. A rigid metal-resin-metal sandwich laminate capable of withstanding 180° bending with a threshold bending inner diameter of zero, said laminate comprising a resin layer sandwiched between and bonded to outer metal layers, characterized in that the resin layer is comprised of a core sheet sandwiched between outer resin sheets, said core sheet being made of a resin which exhibits plastic behavior and which is bonded to said outer resin sheets with or without an adhesive layer and said outer resin sheets being made of a ductile resin which does not exhibit yielding behavior or necking when stretched, and said ductile resin being selected from a copolymer or polymeric blend of ethylene or propylene with one or more α,β-ethylenically unsaturated monomers, a copolymer or polymeric blend of vinyl chloride with one or more α,β-ethylenically unsaturated monomers, a blend of poly(vinyl chloride) with one or more plasticizers, and elastomeric resins.

12. The rigid metal-resin-metal sandwich laminate according to claim 11 wherein the core sheet of the resin layer is comprised of a resin material selected from polyethylene, polypropylene, poly(4-methylpentene-1), poly(vinyl chloride), ABS resin, fluorocarbon resins, polyamides, polyesters, polycarbonates, polyacetals, acrylic resins and copolymers thereof.

13. The rigid metal-resin-metal sandwich laminate according to claim 12 wherein the core sheet of the resin layer is comprised of a resin material selected from polyethylene, polypropylene, poly(4-methylpentene-1), polyamides and polyesters.

14. The rigid metal-resin-metal sandwich laminate according to claim 11 wherein each outer resin sheet has a thickness of at least 1 μm.

15. An article made of the sandwich laminate defined in claim 11 through working including bending forming.

16. An article made of the sandwich laminate defined in claim 11 through working including 180° bending.

* * * * *